(12) United States Patent
Mirrashidi et al.

(10) Patent No.: US 8,117,309 B2
(45) Date of Patent: Feb. 14, 2012

(54) RE-DOWNLOAD MANAGEMENT OF PREVIOUSLY ACQUIRED DIGITAL MEDIA ASSETS

(75) Inventors: Payam Mirrashidi, San Francisco, CA (US); Neale Patton, Twickenham (GB); Colin Meldrum, Berkeley, CA (US); David Neumann, Portland, OR (US); Alan Ward, Boulder, CO (US); Hiro Mitsuji, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 255 days.

(21) Appl. No.: 12/356,474

(22) Filed: Jan. 20, 2009

(65) Prior Publication Data

US 2010/0185655 A1 Jul. 22, 2010

(51) Int. Cl.
*G06F 15/16* (2006.01)
(52) U.S. Cl. .......... 709/225; 709/203; 709/223; 726/30; 726/31
(58) Field of Classification Search .......... 709/203, 709/223, 224, 226, 225; 726/26–33
See application file for complete search history.

(56) References Cited

U.S. PATENT DOCUMENTS

| | | |
|---|---|---|
| 7,173,177 B1 | 2/2007 | Gould et al. |
| 7,707,221 B1 | 4/2010 | Dunning et al. |
| 7,801,824 B1 | 9/2010 | Bryar et al. |
| 2003/0079038 A1 | 4/2003 | Robbin et al. |
| 2003/0167318 A1 | 9/2003 | Robbin et al. |
| 2004/0268451 A1 | 12/2004 | Robbin et al. |
| 2005/0021478 A1 | 1/2005 | Gautier et al. |
| 2005/0203959 A1 | 9/2005 | Muller et al. |
| 2005/0216855 A1 | 9/2005 | Kopra et al. |
| 2005/0273399 A1 | 12/2005 | Soma et al. |
| 2006/0248113 A1 | 11/2006 | Leffert et al. |
| 2008/0005179 A1 | 1/2008 | Friedman et al. |
| 2008/0027868 A1 | 1/2008 | Ljung et al. |
| 2008/0120199 A1 | 5/2008 | Pirnack |
| 2008/0120609 A1 | 5/2008 | Gates et al. |
| 2008/0134032 A1 | 6/2008 | Pirnack et al. |
| 2008/0147556 A1 | 6/2008 | Smith |
| 2008/0148362 A1* | 6/2008 | Gilder et al. ............ 726/4 |
| 2008/0229335 A1 | 9/2008 | Robbin |
| 2009/0063301 A1 | 3/2009 | Ward et al. |
| 2010/0082663 A1 | 4/2010 | Cortes et al. |

FOREIGN PATENT DOCUMENTS

WO  WO 2007/040184 A1  4/2007

OTHER PUBLICATIONS

International Search Report and Written Opinion for PCT/US2010/021422 dated Mar. 25, 2010.

* cited by examiner

*Primary Examiner* — David Lazaro

(57) ABSTRACT

Improved techniques that enable users to download digital media assets are disclosed. According to one aspect, digital media assets that a user has acquired from a remote media repository can be authorized for download multiple times. This, for example, allows a user to subsequently re-downloaded digital media assets that the user previously acquired. In one embodiment, digital media assets that a user previously downloaded to a user client device from a remote media repository can be made available to the user for subsequent re-download. Advantageously, a remote media repository can, in effect, provide users with a remote backup for previously acquired digital media assets.

25 Claims, 12 Drawing Sheets

RE-DOWNLOAD MANAGEMENT OF PREVIOUSLY ACQUIRED DIGITAL MEDIA ASSETS

BACKGROUND OF THE INVENTION

1. Field of the Invention

The present invention relates to download of digital media assets and, more particularly, to re-download of previously acquired digital media assets.

2. Description of the Related Art

Today, it is common for users to access on-line media repositories to acquire songs or videos, such as movies or television shows. The typical interaction with an on-line media repository is that a user will browse the on-line media repository, select one or more media items to be acquired, and then receive electronic delivery of the items over a network.

Digital media assets, such as songs, television shows and movies, can be acquired from an online media repository and stored on personal computing devices. However, storage of such digital media assets consume large amounts of data storage. Hence, it is not uncommon for users to consume much of their local data storage capacity for media storage. In such cases, users sometimes delete previously acquired digital media assets from their personal computing devices. While this may free up a portion of their local data storage capacity, users lose their authorized copy of the digital media assets that they have deleted. Although users could be proactive and copy the removed digital media assets to another data storage device, such as an external hard drive or removable data storage device, users often do not go to such effort.

Unfortunately, it is not uncommon that users subsequently desire to access digital media assets that they have previously acquired but have since deleted. Conventionally, users would be required to again acquire another authorized copy of the digital media assets. This can involve the user paying for something they previously purchased. Thus, there is a need to facilitate users ability to obtain authorized copies of digital media assets without having to necessarily locally maintain their initially obtained authorized copy.

SUMMARY OF THE INVENTION

The invention pertains to improved techniques that enable users to download digital media assets. According to one aspect, digital media assets that a user has acquired from a remote media repository can be authorized for download multiple times. This, for example, allows a user to subsequently re-downloaded digital media assets that the user previously acquired. In one embodiment, digital media assets that a user previously downloaded to a user client device from a remote media repository can be made available to the user for subsequent re-download. Advantageously, a remote media repository can, in effect, provide users with a remote backup for previously acquired digital media assets.

In general, the invention can be implemented in numerous ways, including as a method, system, device, or apparatus (including graphical user interface and computer readable medium). Several embodiments of the invention are discussed below.

As a method for downloading a digital media asset from a network-based storage device to a client device via a network, one embodiment of the invention can, for example, include at least: identifying a digital media asset of interest; receiving an acquisition request for the identified media asset from a requester operating the client device; determining whether any re-downloads are available for the identified media asset; informing the requester of the available re-downloads for the identified media asset; receiving a user input indicating whether the requester desires to initiate a re-download request or continue with the acquisition request in view of the available re-downloads for the identified media asset; and processing the re-download request if the user input received indicates that the requester desires to receive a re-download instead of continuing with the acquisition request.

As a method for downloading digital media assets from a network-based storage device to a client device via a network, one embodiment of the invention can, for example, include at least: presenting information at the client device regarding re-download availability of one or more digital media assets; receiving a re-download request for an identified one or more of the digital media assets having re-download availability; and processing the re-download request such that the identified one or more of the digital media assets are made available to be downloaded from the network-based storage device to the client device.

As a method for re-downloading a digital media asset from a remote media repository to a client device via a network, one embodiment of the invention can, for example, include at least: receiving a re-download information request from a requestor via the client device; determining those one or more digital media assets previously acquired by the requestor that are eligible for re-download by the requester; sending information to the client device for presentation of information to the requestor regarding the determined one or more digital media assets that are eligible for re-download by the requester; receiving a re-download request for a media asset selected from the one or more digital media assets that are eligible for re-download by the requester; and processing the re-download request for the selected media asset.

As a system for managing re-download of digital media assets, one embodiment of the invention can, for example, include at least: user accounts established for a plurality of account holders; a media storage device configured to store a plurality of digital media assets; a server device for providing online access to browse or acquire one or more of the digital media assets; and a re-download manager configured to manage availability of re-downloads for qualifying ones of the digital media assets in accordance with the user accounts with respect to a particular account holders.

As a computer readable storage medium including at least computer program code stored thereon that can be used by a computer to download digital media assets from a network-based storage device to a client device via a network, one embodiment of the invention can, for example, include at least: computer program code for presenting information at the client device regarding re-download availability of one or more digital media assets; computer program code for receiving a re-download request for an identified one or more of the digital media assets having re-download availability; and computer program code for processing the re-download request such that the identified one or more of the digital media assets are made available to be downloaded from the network-based storage device to the client device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved techniques that enable users to download digital media assets. According to one aspect, digital media assets that a user has acquired from a remote media repository can be authorized for download multiple times. This, for example, allows a user to subsequently re-downloaded digital media assets that the user previously acquired. In one embodiment, digital media assets that a user previously downloaded to a user client device from a remote media repository can be made available to the user for subsequent re-download. Advantageously, a remote media repository can, in effect, provide users with a remote backup for previously acquired digital media assets.

Digital media assets can be audio, graphic, video, or some combination thereof. A set of digital media items is a group of digital media assets. A set of digital media assets can, for example, pertain to a group, collection, playlist, or bundle of digital media assets. As examples, a set of digital media assets can pertain to an album (i.e., a set of songs), a television series or season (i.e., a set of television shows/episodes), a photo album (i.e., a set of photos or images), a video album (i.e., a set of videos)(e.g., movies or music videos), or a set of podcasts (i.e., a set of podcast episodes).

Embodiments of the invention are discussed below with reference to FIGS. 1-11. However, those skilled in the art will readily appreciate that the detailed description given herein with respect to these figures is for explanatory purposes as the invention extends beyond these limited embodiments.

Figure 1:
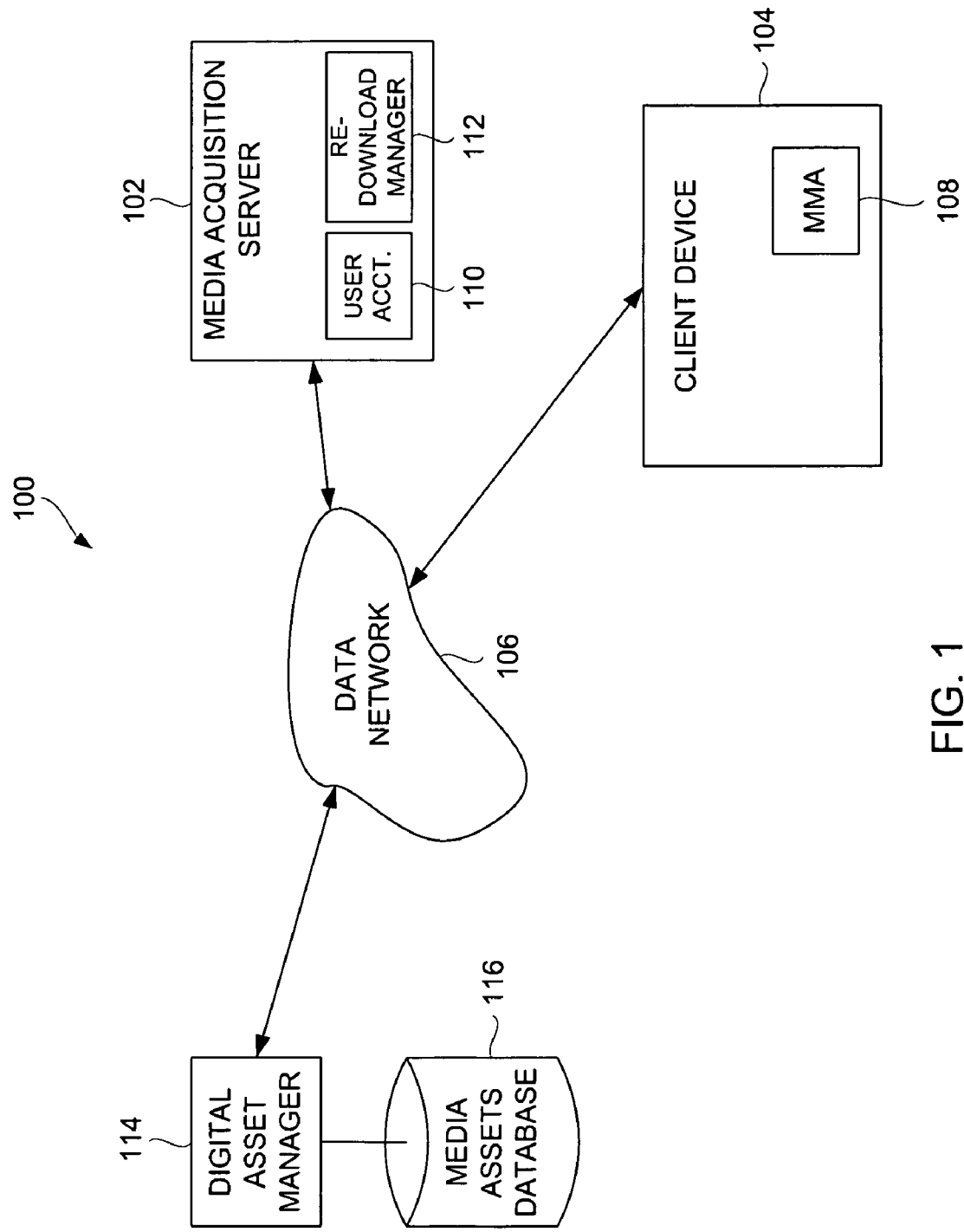
FIG. 1 is a block diagram of a media acquisition system according to one embodiment of the invention.

FIG. 1 is a block diagram of a media acquisition system 100 according to one embodiment of the invention. The media acquisition system 100 includes a media acquisition server 102 that hosts an on-line media repository. The media acquisition server 102 can off-load commerce transactions and/or delivery of acquired digital media assets to other servers, if desired. As shown in FIG. 1, the media acquisition system 100 includes one or more client devices 104 for use by end users. The client devices 104 couple to a data network 106. Additionally, the media acquisition server 102 also couples to the data network 106. In one implementation, the data network 106 can refer to one or more data networks, typically, high data-bandwidth networks, namely, wired networks, such as the Internet, Ethernet, gigabit Ethernet, and fiber optic, as well as wireless networks such as IEEE 802.11 (a), (b) or (g) (WiFi), IEEE 802.16 (WiMax), and Ultra-Wide Band (UWB).

A computer program 108, typically a media management application (MMA) or other media player application runs on the client device 104. One example of a media management application is the iTunes® application, produced by Apple Inc. of Cupertino, Calif. The client devices 104 are, in general, computing devices. As an example, the client devices 104 can be specific or general-purpose personal computers or portable media players. The computer program 108 can be used by a consumer for a variety of purposes, including, but not limited to: (i) browsing and/or purchasing media assets (including sets of media assets) from an on-line media repository (e.g., on-line media store) provided by the media acquisition server 102, (ii) creating and sharing media asset groups (e.g., playlists), (iii) organizing media assets, (iv) presenting/playing media assets, and/or (v) transferring media assets between client devices 104. In an alternative embodiment, the computer program 108 can be a network browser application (e.g., web browser).

The media acquisition system 100 can also include a digital asset manager 114. The digital asset manager 114 is coupled to a media assets database 116. The media assets database 116 stores media asset information including metadata relating to digital media assets available for purchase at the on-line media store. In one embodiment, the digital asset manager 114 can control what media assets and media asset information are available on the on-line media repository. The metadata can pertain to individual media assets (digital media assets) or media asset groups (digital media asset groups). One type of group of digital media assets is an album, such as an audio album or a video album. Another type of group of digital media assets is a season or a series of media assets (e.g., television series or movie sequels). The digital assets within a media asset group can include video, audio, text, and/or graphics files.

The media acquisition server 102 enables the user of a particular client device 104 to acquire digital media assets. The client device 104 can download the purchased media assets from the media acquisition server 102, or some other server, such as the digital asset manager 114, via the data network 106. The media acquisition server 102 and/or the digital asset manager 114 can also be referred to as a network-based storage device.

Acquisition of a digital media asset can pertain to purchase of the digital media asset. Apart from acquisition of digital media assets, the media acquisition server 102 can also enable the user to re-download digital media assets. In one embodiment, digital media assets that have been previously acquired are permitted to be re-downloaded to a limited extent. For example, the re-download manager 112 can limit availability of re-downloads to particular digital media assets and to a limited quantity of re-downloads.

The media acquisition server 102 can include user accounts 110 and a re-download manager 112. The user accounts 110 store distinct user account information for a plurality of users. The user account information for a given user can include user profile information, authorized client devices and acquisition history. The user account information can also store re-download allocations for previously acquired digital media assets. The re-download manager 112 can control availability of re-downloads for the media acquisition server 102.

In one embodiment, login is required for the media acquisition server 102 to recognize the user. Typically, the user accounts 110 will maintain an account for the user. The user can, for example, login in using a user name and a password. If a user initiates a purchase of a digital media asset with the on-line media repository before being login (or otherwise recognized), the media acquisition server 102 can require login to process the purchase. After successful login, the media acquisition server 102 can present a re-download opportunity for the media asset. Here, in one implementation, although the user has already requested to purchase a digital media asset, the media acquisition server 102 can inform the user of the availability of a re-download opportunity. In other words, the user is effectively informed that they can instead re-download the media asset and in doing so they can reduce their cost.

As will be understood by those familiar with data networks, other network configurations are possible. Furthermore, while the media store server 102 and the digital asset manager 114 are shown as individual and separate devices, it will be understood by those familiar with the art that other configurations are possible. As one example, each device can be implemented such that it is distributed over multiple server computers. As another example, these various servers and/or managers can be implemented by a single physical server computer.

Figure 2:
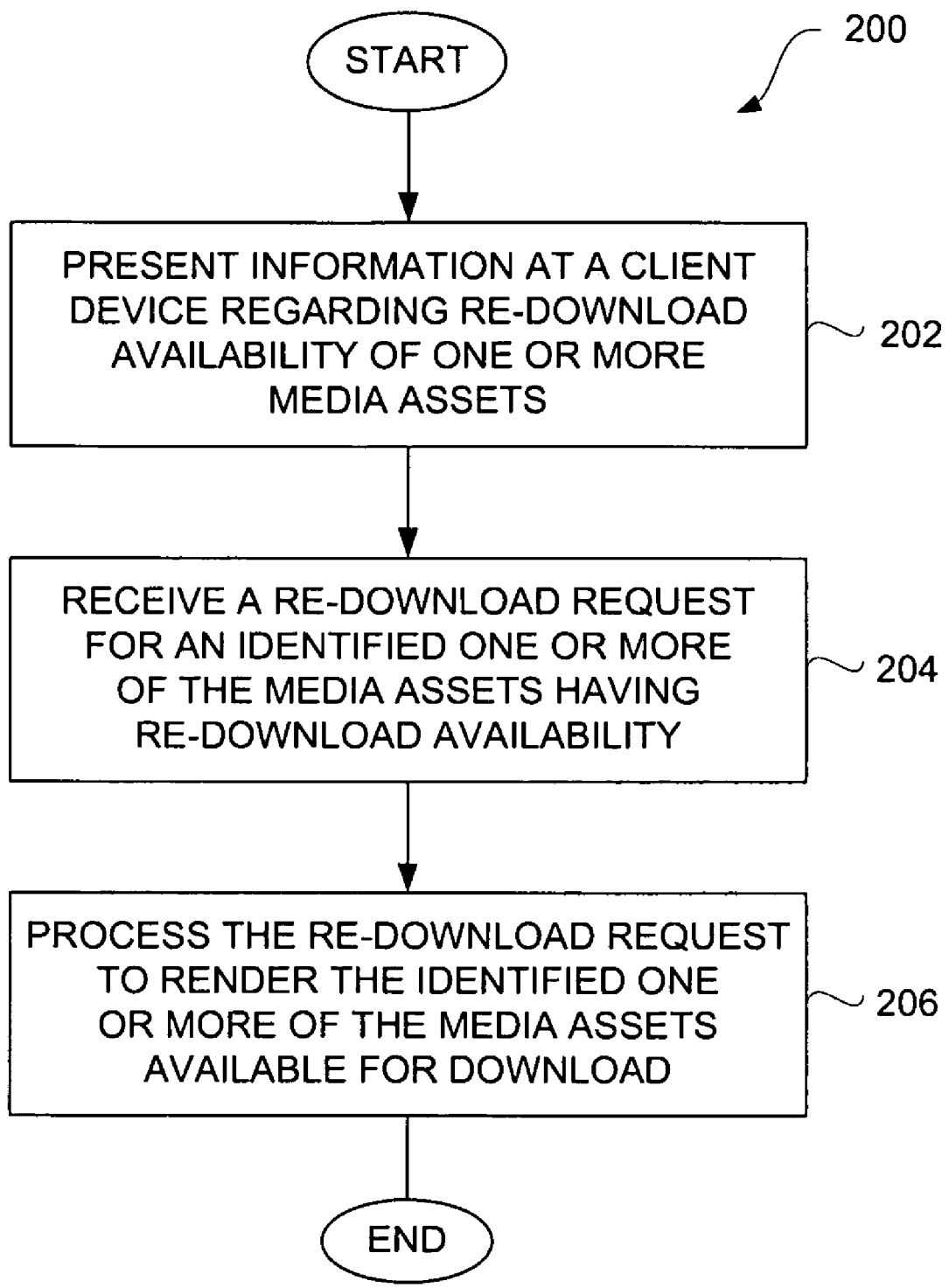
FIG. 2 is a flow diagram of a re-download process according to one embodiment of the invention.

FIG. 2 is a flow diagram of a re-download process 200 according to one embodiment of the invention. The re-download process 200 can, for example, be performed by a server computer, such as the media acquisition server 102 illustrated in FIG. 1.

The re-download process 200 presents 202 information at a client device regarding re-download availability of one or more media assets (digital media assets). The information being presented serves to at least inform a user of re-download availability of the one or more media assets. For example, the information being presented 202 can pertain to an information page presented on a display device associated with the client device. Specifically, in one implementation, the information page can pertain to a webpage having information provided by the server computer performing the re-download process 200.

Next, a re-download request for an identified one or more of the media assets having re-download availability can be received 204. In one embodiment, the re-download availability for media assets can be dependent on the user (or user account). Here, the information being presented 202 can identify the one or more media assets having re-download availability. The user of the client device can then operate to identify one or more of the media assets for which a re-download is requested. In other words, the user can initiate a re-download request for one or more of the media assets that are available for re-download. Thereafter, the re-download request can be processed 206 to render the identified one or more of the media assets available for download. Following the block 206, the re-download process 200 can end. However, it should be noted that once the identified one or more of the media assets have been rendered available for download, the identified one or more of the media assets can subsequently be downloaded from the server computer to the client device via a network, such as the Internet.

In one environment, a user that has previously acquired a digital media asset from a remote media repository can subsequently re-receive the previously acquired digital media asset. For example, a user might have previously acquired a particular digital media asset and downloaded a copy thereof to the user's client device. However, after one or more times using (playing) the digital media asset, the user might elect to discard the copy of the digital media asset from the user's client device. Often, digital media assets consume significant data storage space and thus there is often a need to delete those digital media assets from user's client device that are less likely to be needed. On the other hand, users tend not to properly backup the deleted media assets onto another data storage device. Hence, once a digital media asset has been delete from the user's client device, the user often has no access to the digital media asset unless the user again acquires it, which can require that the user again purchase the digital media asset.

To improve this scenario, according to one embodiment of the invention, the user that has acquired a particular digital media asset can also be granted one or more re-downloads of the particular digital media asset. For example, the user might be granted a few (e.g., 3, 4 or 5) re-downloads for a given digital media asset. Hence, the user that has previously deleted the originally downloaded copy of the particular digital media asset can some time thereafter, when the need occurs, access the remote media repository to again download (i.e., re-download) a copy of the particular digital media asset. The quantity of re-downloads that is permitted can very depending upon acquisition cost, user, media type, acquisition date, or various other rules (e.g., business rules). The server or remote media repository can monitor and manage the number of re-downloads that are permitted so as to enforce the quantity limits that might be imposed on re-downloads.

In one embodiment, the user account 110 illustrated in FIG. 1 can be use to store re-download management data. For each user account 110, one or more data storage tables can be provided to store re-download management data. Table I below is an example of a re-download management table.

TABLE I

| Media Asset Identifier | Media Asset Type | Re-download Allocation |
|---|---|---|
| ABC12345 | X | 3 |
| XYZ54321 | Y | 2 |
| GHJ54232 | X | 0 |

In Table I the digital media asset "ABC12345" has a re-download allocation of three (3), meaning that the digital media asset "ABC12345" is eligible to be re-downloaded three times. The media asset type can be use if multiple types of a particular digital media asset are available to limit the re-download to the same of media asset type as previously acquired. The media assets type can pertain to a quality level (e.g., high density) or restrictions (e.g., digital rights management) being imposed. Additionally, the Table I can further include or link to acquisition information, such as when acquired (purchased), cost, date, etc. Still further, the Table I can include or link to information indicating whether or not the owner of the media asset (e.g., producer) has authorized the media asset to be generally available for re-downloads.

Re-downloads to client devices can also be limited by digital rights management (DRM) rules. In one embodiment, the client device to receive the re-download can impact whether the re-download is permitted. As an example, the client device may need to be an authorized device that is associated with the user's account or be a device that is paired with such an authorized device. In another embodiment, independent of authorization, re-download of a media asset can be permitted to the same client device that originally purchased the media asset.

Figure 3:
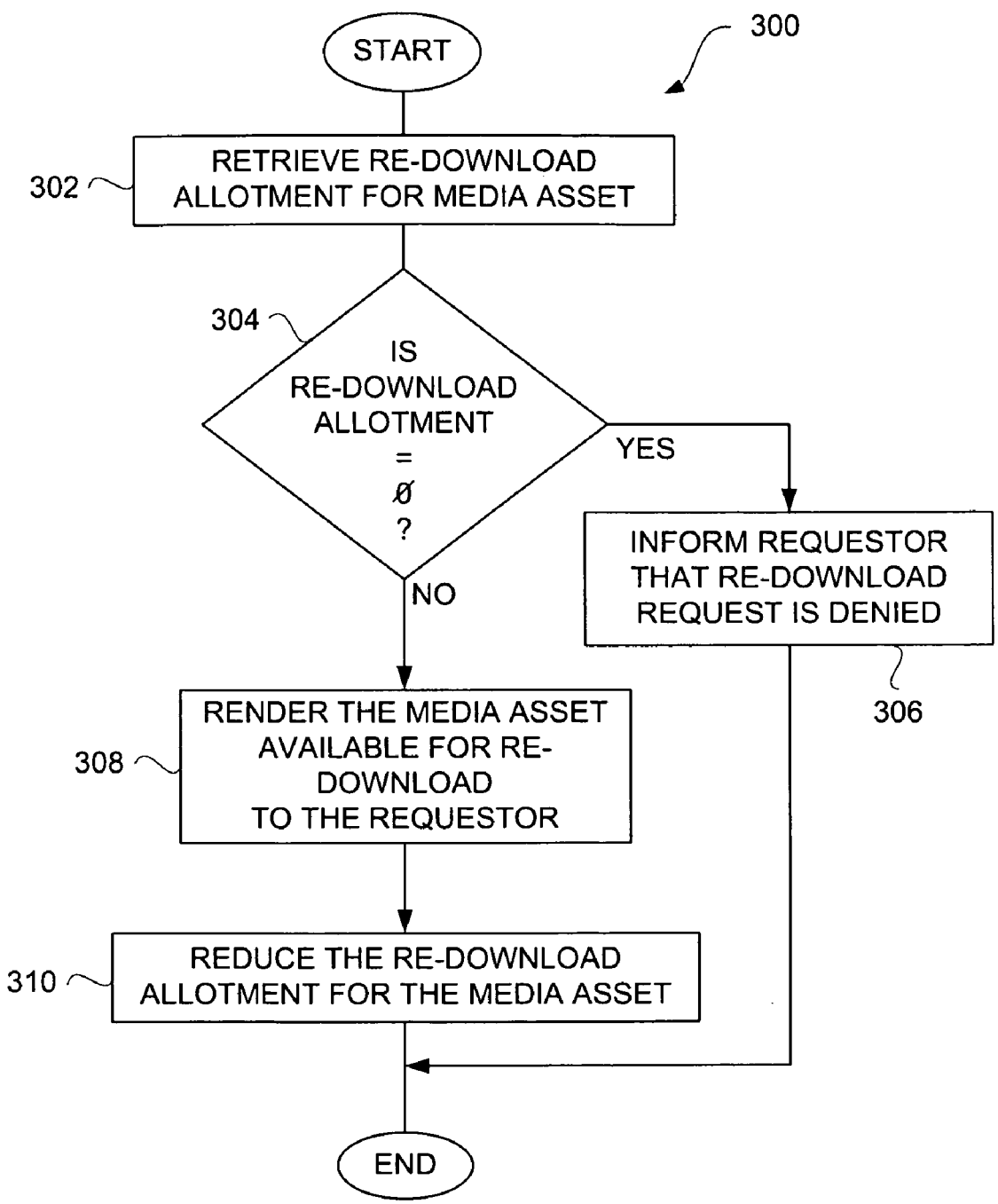
FIG. 3 is a flow diagram of a re-download request process according to one embodiment of the invention.

FIG. 3 is a flow diagram of a re-download request process 300 according to one embodiment of the invention. The re-download request process 300 is, for example, processing performed by the block 206 illustrated in FIG. 2 in response to a re-download request.

The re-download request process 300 can, for example, operate in response to receiving a re-download request. For example, through user interaction with a graphical user interface, a user can initiate or enter a request for re-download of a media asset. In response to receiving a re-download request, the re-download request process 300 can retrieve 302 a re-download allotment for the digital media asset being requested. The re-download allotment is the quantity of re-downloads that is permitted for the media asset by the particular user (requester). For example, some requesters may be entitled to larger number of re-downloads than other users, or some media assets may be entitled to different quantities of re-downloads than other media assets.

After the re-download allotment for the media asset has been retrieved 302, a decision 304 can determine whether the re-download allotment is zero (0). When the re-download allotment is zero (0), there are no additional re-downloads authorized for the particular media asset by the requester. In such a situation, the requester is informed 306 that in the re-download request is denied. In this case, the requester is not able to re-download the media asset of interest. As such, the requester, if desired, would have to again acquire the digital media asset such as through purchase from an authorized online media store.

On the other hand, when the decision 304 determines that the re-download allotment is not equal to zero, then the requester is permitted to re-download the media asset of interest. In such case, the media asset being requested can be rendered 308 available for re-download to the requester. In addition, the re-download allotment for the media asset can be reduced 310 given that the requestor has utilized one of the available re-downloads. For example, the re-download allotment can be decremented at block 310. The reduction in the re-download allotment serves to manage the limits on the quantity of permitted re-downloads. For example, assuming the re-download allotment is three (3), then once the media asset is rendered 308 available for download by the requester, the re-download allotment for the media asset can be reduced 310 from three (3) to two (2). Following the block 310 when re-download has been permitted, or following the block 306 when re-download is denied, the re-download request process 300 can end.

Figure 4:
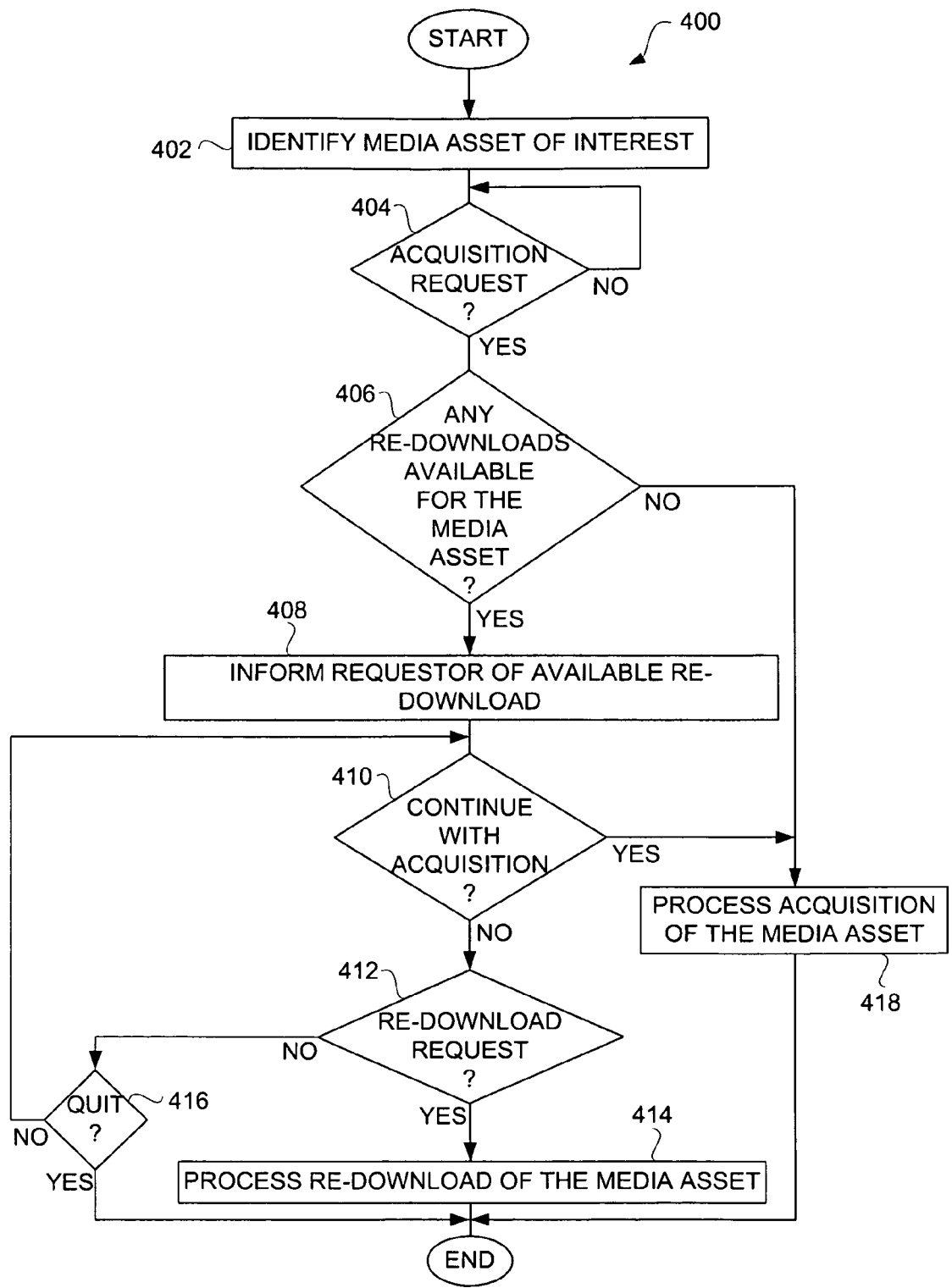
FIG. 4 is a flow diagram of an acquisition process according to one embodiment of the invention.

FIG. 4 is a flow diagram of an acquisition process 400 according to one embodiment of the invention. The acquisition process 400 can be performed by a server, such as the media acquisition server 102 illustrated in FIG. 1.

The acquisition process 400 identifies 402 a media asset (digital media asset) of interest. A decision 404 then determines whether an acquisition request for the identified media asset has been received. When the decision 404 determines that an acquisition request has not yet been received, the acquisition process 400 can await such a request. Once the decision 404 determines that an acquisition request has been received, a decision 406 can determine whether there are any re-downloads available for the identified media asset. Here, for example, the media asset of interest has a re-download allotment associated with a requester that is maintained at the server. Hence, the decision 406 can, for example, access an appropriate re-download allotment to determine whether the media asset of interest is permitted to be re-downloaded by the requester.

When the decision 406 determines that the identified media asset is permitted to be re-downloaded by the requester, the requestor is informed 408 of the availability of the identified media asset for re-download. The requestor can be informed 408 in a variety of different ways depending on implementation. For example, in one implementation, a graphical user interface can present information to the requestor that serves to inform 408 the requester of the available re-download. The graphical user interface can present the information by one or more of an icon, a dialog box, an image, a page, etc. In another implementation, an audio message can be presented to the requester to inform 408 the requester of the available re-download.

Next, a decision 410 can determine whether the requester desires to continue with the acquisition of the identified media asset. Often the acquisition of the media asset requires payment on a price, such as a cost to a purchase or license to the media asset. Hence, when the identified media asset is able to be re-downloaded (often without charge), the requester may decide to simply re-download the media asset instead of proceeding to acquire the media asset. Hence, when the decision 410 determines that the requester no longer desires to obtain the identified media asset through acquisition, a decision 412 determines whether a re-download request has been received from the requester. Here, a decision 412 determines whether the requester that previously made the acquisition request now instead makes the re-download request. When the decision 412 determines that a re-download request has been received, the re-download of the identified media asset can be processed 414. Here, the requester is able to re-download the identified media asset to any client device associated with the requester. Alternatively, when the decision 412 determines that a re-download request has not yet been received, a decision 416 can determine whether the acquisition process 400 should quit (or end). When the decision 416 determines that the acquisition process 400 should not quit, the acquisition process 400 returns to repeat the decision 410 so that the acquisition process 400 can continue to monitor whether the requester desires to continue with the acquisition request or instead re-download the identified media asset.

On the other hand, in the event that the decision 410 determines that the requester desires to continue with the acquisition of the identified media asset, the acquisition of the identified media asset can be processed 418. As previously noted, the acquisition of the identified media asset typically comes at a price (cost), such as a purchase cost from an online media store.

Following the block 414 after the identified media asset has been re-downloaded, following the decision 416 when the acquisition process 400 is to quit, or following the block 418 after the identified media asset has been acquired through acquisition, the acquisition process 400 can end.

Figure 5:
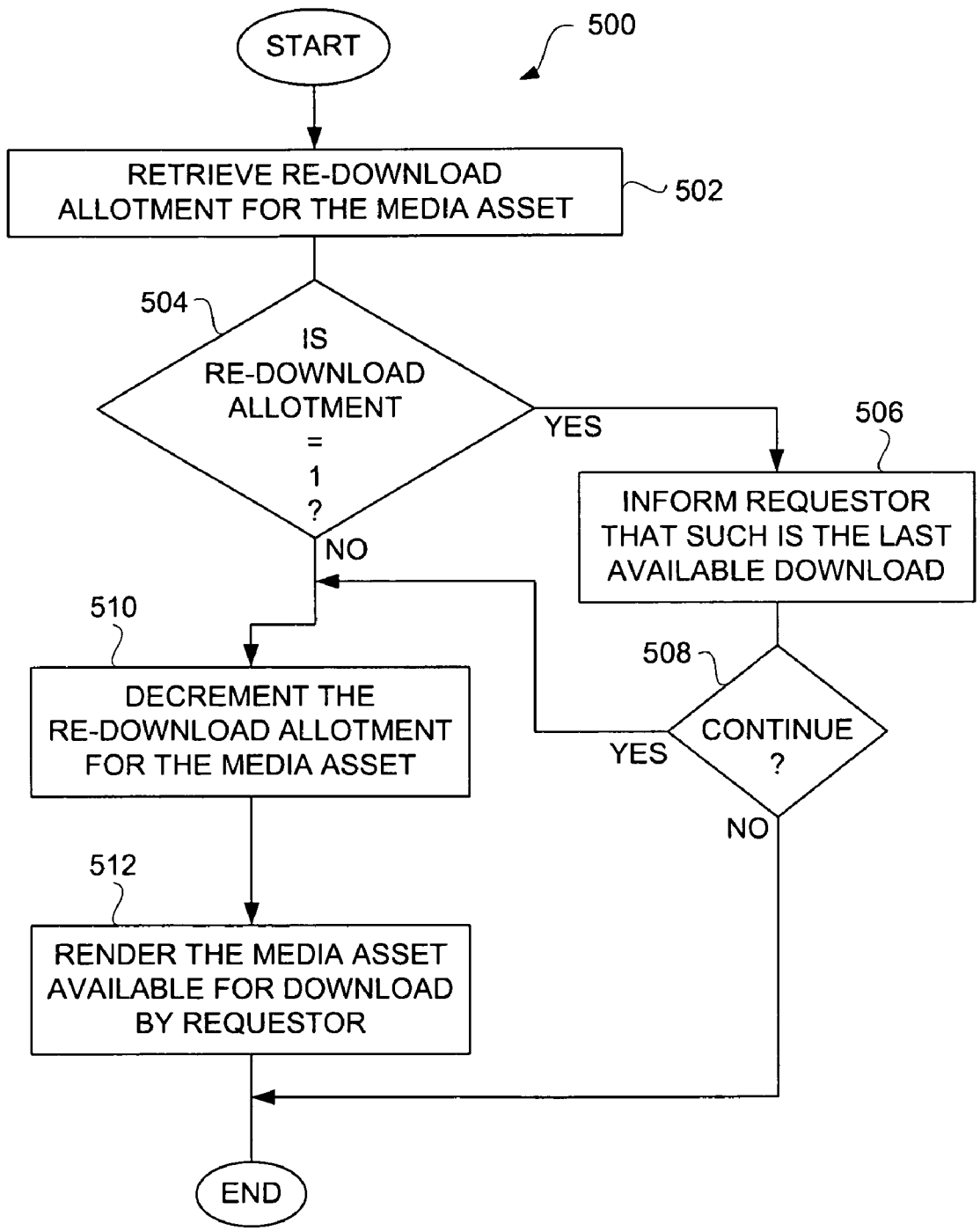
FIG. 5 is a flow diagram of a re-download process according to one embodiment of the invention.

FIG. 5 is a flow diagram of a re-download process 500 according to one embodiment of the invention. The re-download process 500 can, for example, be activated by a requester through a user input action. In one implementation, the user input action can be user interaction with a graphical user interface control (e.g., virtual button) associated with a re-download request. Typically, the user input action corresponds to a re-download request for a particular media asset.

In any case, when the re-download process 500 begins, a re-download allotment for a particular media asset can be retrieved 502. A decision 504 can then determine whether the re-download allotment is equal to one (1). When the decision 504 determines that the re-download allotment equals one (1), then the requester can be informed 506 that the currently requested re-download will be the last available download for the particular media asset. A decision 508 can then determine whether the requester desires to continue with the re-download or whether the requester instead prefers to abort the re-download request.

When a decision 508 determines that the requester desires to continue with the re-download of the particular media asset, the re-download process 500 continues. Here, the re-download allotment for the particular media asset can be decremented 510 (i.e., reduced by one). In addition, the particular media asset can be rendered 512 available for download by the requester. For example, the particular media asset can be coordinated such that the requester is able to download the particular media asset to a client device immediately or subsequently when more convenient for the requester. As another example, the particular media asset can be delivered to a client device associated with the requester. Following the block 512, or following the decision 508 when the re-download request is to be aborted, the re-download process 500 can end.

Figure 6:
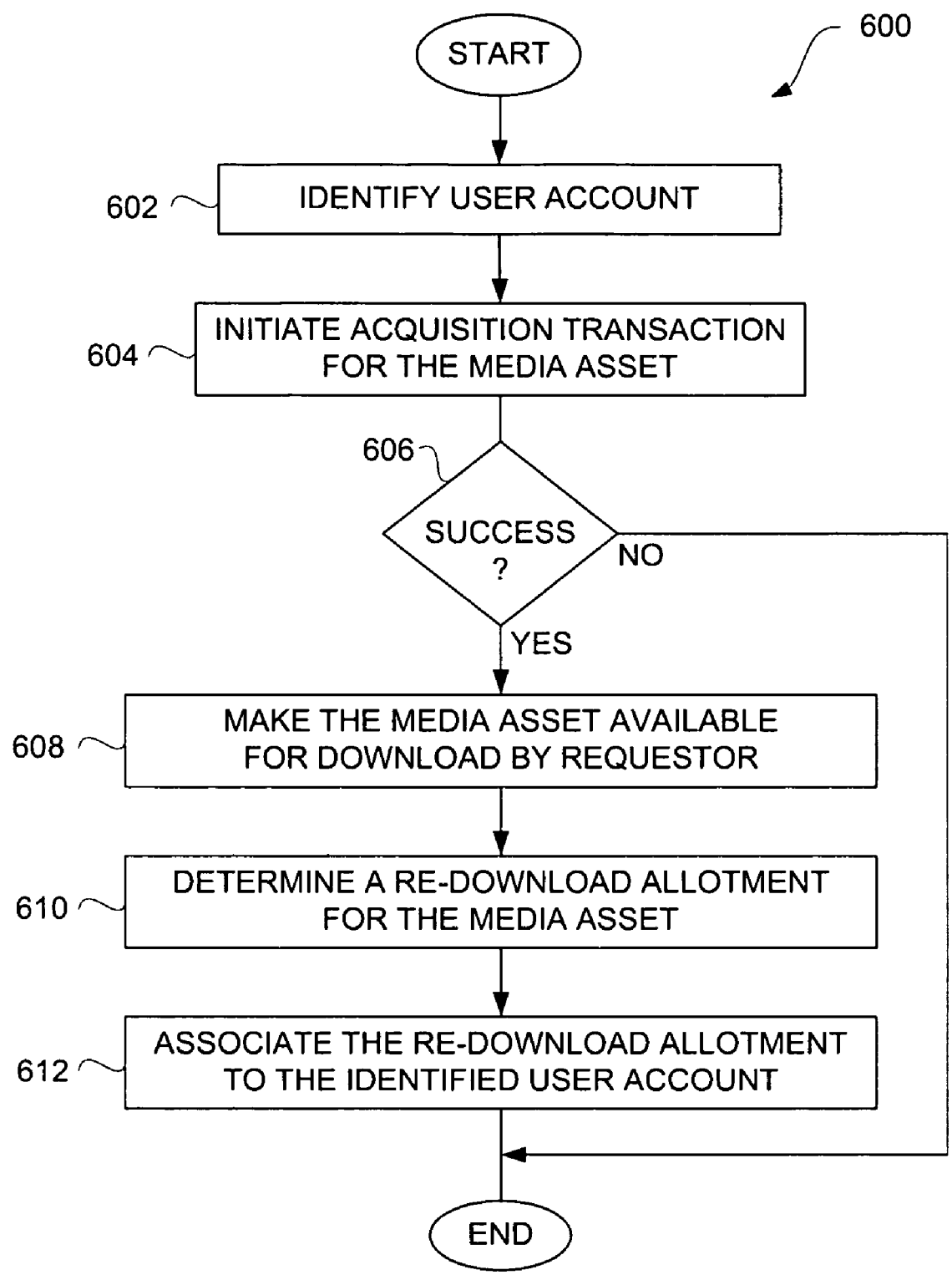
FIG. 6 is a flow diagram of an acquisition process according to one embodiment of the invention.

FIG. 6 is a flow diagram of an acquisition process 600 according to one embodiment of the invention. The acquisition process 600 can initially identify 602 a user account associated with a requester for a particular media asset. An acquisition transaction for the particular media asset can then be initiated 604. For example, if the acquisition of the particular media asset requires payment of a fee, the acquisition transaction can include processing to obtain payment for the particular media asset.

A decision 606 can then determine whether the acquisition transaction has been successful. When the decision 606 determines that the acquisition transaction was successful, the particular media asset can be made 608 available for download by the requester. In addition, a re-download allotment can be determined 610 for the media asset. Different criteria or rules can be utilized to assign different re-download allotments to different media assets. For example, media assets purchased at a particular price point can be provided with more re-download allotments then other media assets having a lower price point. As another example, media assets purchased before or after certain dates can be allocated more or less re-download allotments. As still another example, media assets of different media types can be provided with different re-download allotments. Thereafter, the re-download allotment can be associated 612 to be identified user account of the requestor. Following the block 612, the acquisition process 600 can end. Also, following the decision 606 when the acquisition transaction is unsuccessful, the acquisition process 600 can directly end without making the media asset available for download and without allotting any re-downloads.

Figure 7:
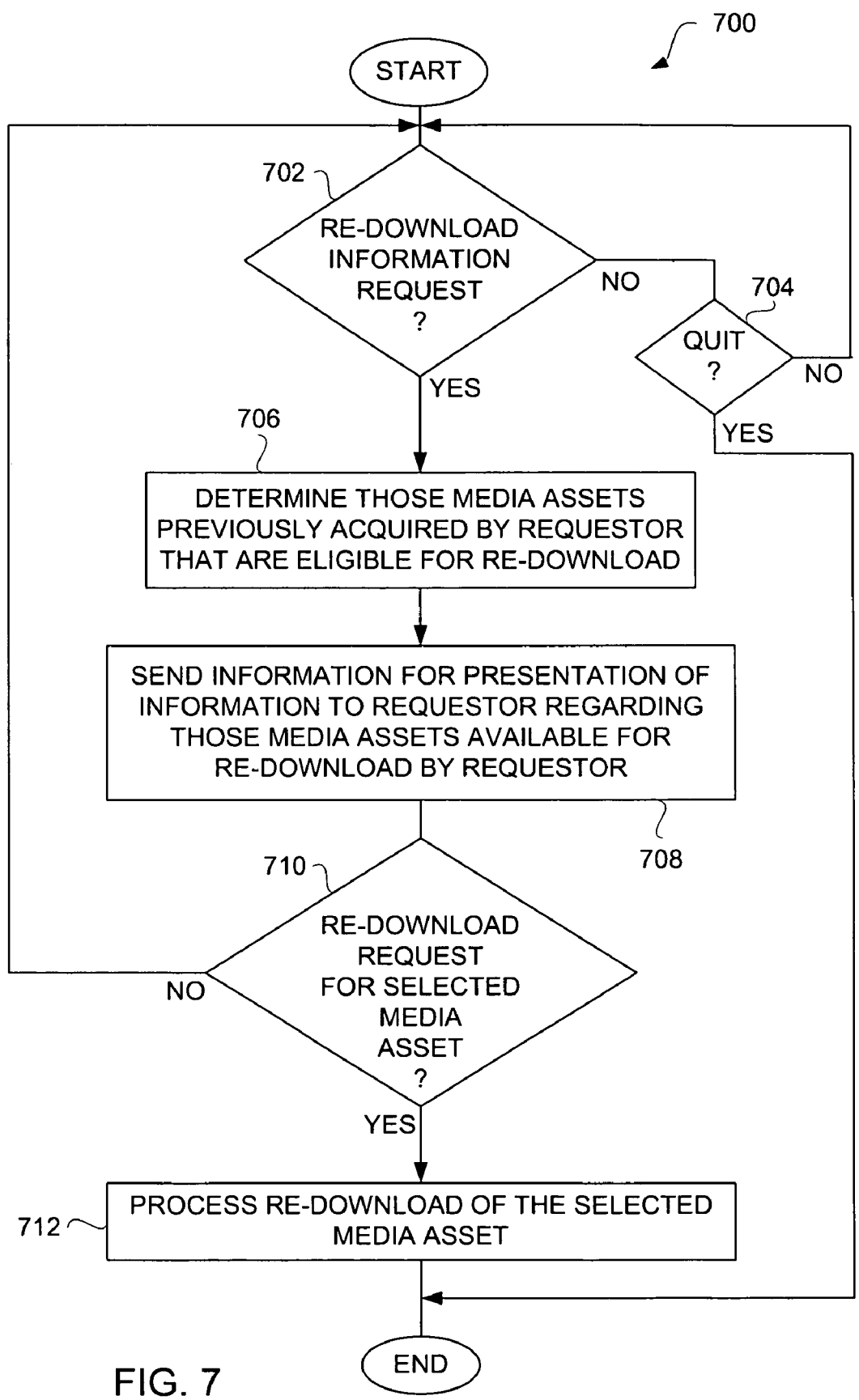
FIG. 7 is a flow diagram of a re-download information process according to one embodiment of the invention.

FIG. 7 is a flow diagram of a re-download information process 700 according to one embodiment of the invention. The re-download information process 700 is, for example, performed by a server, such as the media acquisition server 102 illustrated in FIG. 1.

The re-download information process 700 can begin with a decision 702 that determines whether a re-download information request has been received. When the decision 702 determines that a re-download information request has not been received, a decision 704 can determine whether the re-download information processed 700 should quit (or and). When the decision 704 determines that the re-download information process 700 should not quit, the re-download information process 700 can return to repeat the decision 702.

Once the decision 702 determines that the re-download information request has been received, the re-download information process 700 can determine 706 those media assets previously acquired by the requester that are available for re-download. Next, data for presentation of information to the requester regarding those media assets available for re-download by the requester can be sent 708. As an example, the data for presentation of information to the requester can be sent 708 to a client device associated with the requester. The client device can present the information to the requester.

Next, a decision 710 can determine whether a re-download request for a selected media asset has been received. When the decision 710 determines that a re-download request for a selected media asset has not been received, the re-download information process 700 can return to repeat the block 702 and subsequent blocks. Alternatively, when the decision 710 determines that a re-download request for a selected media asset has been received, re-download of the selected media asset can be processed 712. Following the block 712, the re-download information process 700 can end. Also, the re-download information process 700 can directly end following the decision 704 when the re-download information process 700 is to quit.

Figure 8:
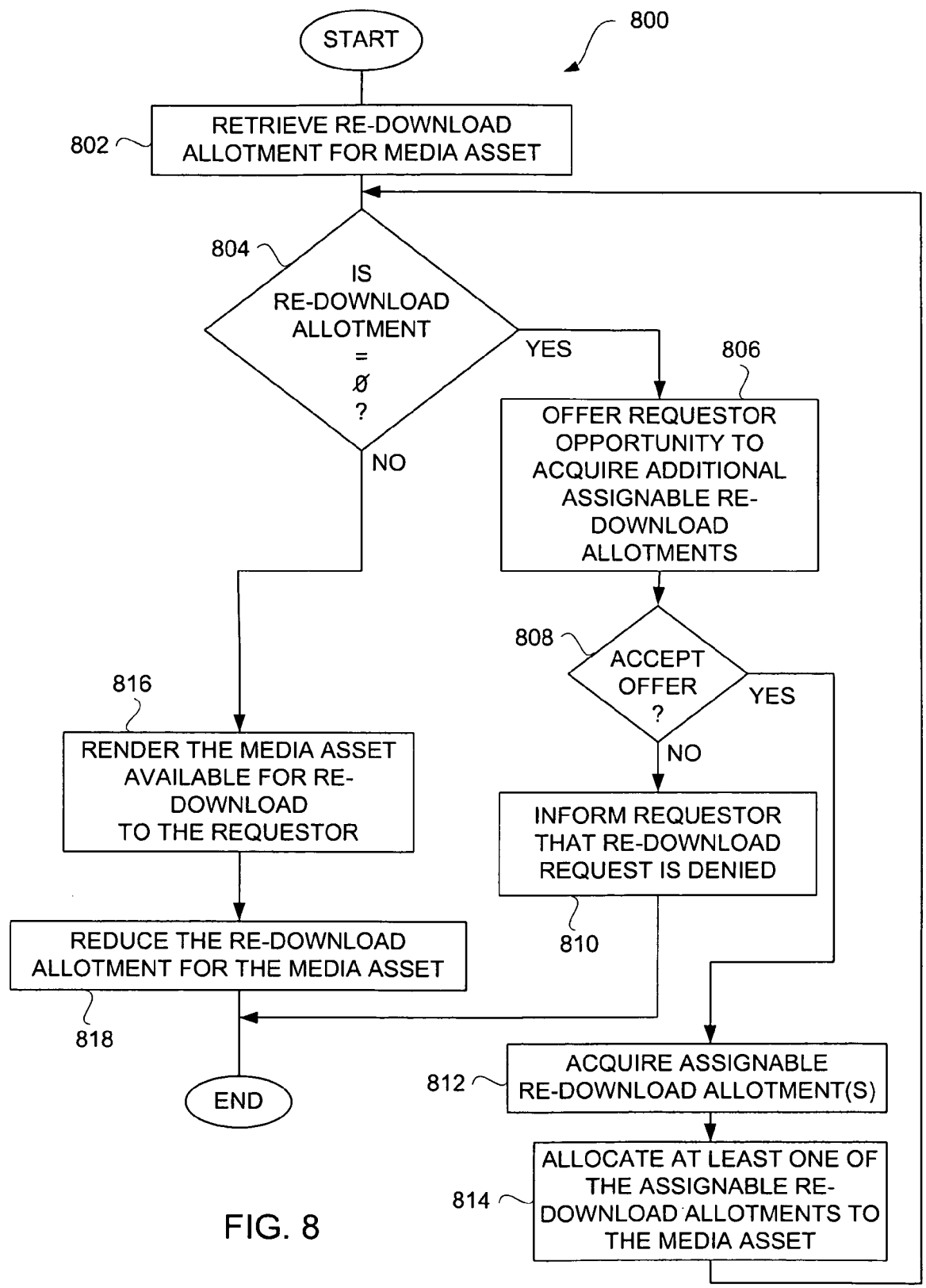
FIG. 8 is a flow diagram of another re-download request process according to one embodiment of the invention.

FIG. 8 is a flow diagram of another re-download request process 800 according to one embodiment of the invention. The re-download request process 800 is, for example, processing performed by the block 206 illustrated in FIG. 2 in response to a re-download request. The re-download request process 800 is similar to the re-download request process 300 illustrated in FIG. 3 except that the re-download request process 800 further includes an opportunity to acquire additional re-download allotments which may needed.

The re-download request process 800 can, for example, operate in response to receiving a re-download request. For example, through user interaction with a graphical user interface, a user can initiate or enter a request for re-download of a media asset. In response to receiving a re-download request, the re-download request process 800 can retrieve 802 a re-download allotment for the digital media asset being requested. The re-download allotment is the quantity of re-downloads that is permitted for the media asset by the particular user (requester).

After the re-download allotment for the media asset has been retrieved 802, a decision 804 can determine whether the re-download allotment is zero (0). When the re-download allotment is zero (0), there are no additional re-downloads authorized for the particular media asset by the requester. In such a situation, according to this embodiment, the requester can be offered an opportunity to acquire additional assignable re-download allotments. For example, the requester might be offered 806 to purchase one or a set of assignable re-download allotments. Each assignable re-download allotment can be used by the requester to acquire one re-download of a media asset previously acquired by the requester. In other words, each assignable re-download allotment can be assigned to a previously purchased media asset such that the requester gains additional re-download capability for one or more media assets. When the cost of an assignable re-download allotment is significantly less than the cost to again acquire a media item, the requester is able to gain assess to previously purchased media assets at a reduced cost.

A decision 808 can determine whether the requester accepts the offer to purchase one or a set of assignable re-download allotments. If the decision 808 determines that the offer is not accepted, the requester is informed 810 that in the re-download request is denied. In this case, the requester is not able to re-download the media asset of interest because the re-download allotment is zero (0) and the requester has declined the offer for assignable re-download allotments. As such, the requester, if desired, would have to again acquire the digital media asset such as through purchase from an authorized online media store. On the other hand, if the decision 808 determines that the offer is accepted, the requester acquires 812 one or more assignable re-download allotments. For example, the requester can purchase one or a set of assignable re-download allotments. Then, at least one of the assignable re-download allotments can be allocated 814 to the media asset. Once at least one of the assignable re-download allotments has been allocated 814, the re-download request process 800 can return to repeat the decision 804 since the re-download allotment for the digital media asset is now greater than zero (0).

Alternatively, when the decision 804 determines that the re-download allotment is not equal to zero, then the requester is permitted to re-download the media asset of interest. In such case, the media asset being requested can be rendered 816 available for re-download to the requestor. In addition, the re-download allotment for the media asset can be reduced 818 given that the requester has utilized one of the available re-downloads. For example, the re-download allotment can be decremented at block 818. The reduction in the re-download allotment serves to manage the limits on the quantity of permitted re-downloads. For example, assuming the re-download allotment is zero (0) and the requester acquires and allocates an assignable re-download allotment to the media asset to increase the re-download allotment for the media asset to one (1), then the media asset is rendered 816 available for download by the requester and the re-download allotment for the media asset can be reduced 818 from one (1) to zero (0). Following the block 818 when re-download has been permitted, or following the block 810 when re-download is denied, the re-download request process 800 can end.

It should be noted that a user (requester) can obtain or make use of assignable re-download allotments apart from processing a re-download request. For example, assignable re-download allotments can be acquired and/or allocated to particular media assets independent of processing a re-download request. Also, a user account associated with a requester can record and/or be used to manage assignable re-download allotments available to the requestor.

In one embodiment, re-download information can be presented to a user in a window or page format. As noted above, at the bock 708 of the re-download information process 700 information concerning media assets available for re-download can be presented. The presentation of such information can be a window or page displayed on a display associated with a client device A request to provide a re-download availability page can be processed by the server device. The re-download availability page can present multiple media assets (e.g., media items or media bundles) that are available to the user for re-download. A user can select any of the media assets presented on the re-download availability page. Upon selection of one of the media assets on the re-download availability page, a media asset page can be presented. The user can interact with the media asset page to acquire the media assets or re-download the media assets.

Figure 9A:
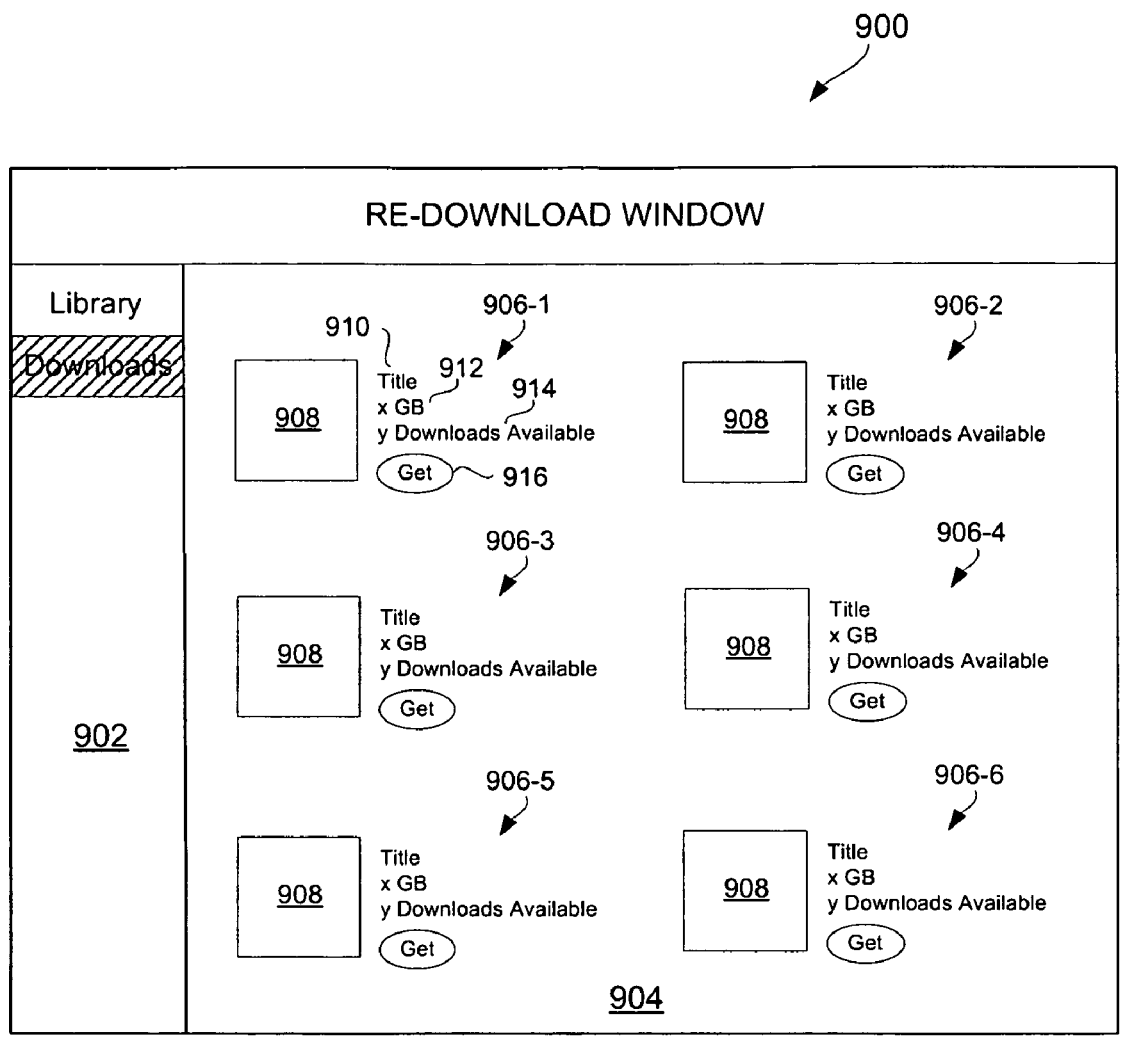
FIG. 9A is a diagram of a representative re-download window according to one embodiment of the invention.

FIG. 9A is a diagram of a representative re-download window 900 according to one embodiment of the invention. The re-download window 900 can also be referred to as an re-download availability page. The re-download window 900 is typically presented on a display associated with a client device when the client device is interacting with a media acquisition server (e.g., on-line media repository) via a computer program, such as a Media Management Application (MMA) or a network browser. The re-download window 900 can be provided locally or remotely. When provided remotely, the content for the re-download window 900 can be provided by a server (web server or server device).

The re-download window 900 includes a source portion 902 and a media re-download availability portion 904. The source portion 902 indicates the source for the information being presented in the media re-download availability portion 904. In this example, the source portion 902 indicates that a "Downloads" source has been selected, such that the information being presented in the media re-download availability portion 904 is information pertaining to available re-downloads for a particular user. In this case, the information being presented in the media re-download availability portion 904 corresponds to one or more media assets 906 that are available to be re-download from the media acquisition server. In this embodiment, each of the media assets 906 can be described by a graphic 908 and a title 910. Each of the media assets 906 can also be described with a size 912 (xGB) and a re-download availability indication 914 (e.g., a number of downloads available). Still further, each of the media assets 906 can also include a user control 916 (e.g., a "Get" button) that, upon selection, can (i) initiate a request for re-download of the associated media asset, or (ii) cause additional re-download or other information pertaining to the associated media asset to be displayed. Although six (6) different media assets 906 are illustrated, the number, organization and appearance of the media assets can vary with implementation.

Figure 9B:
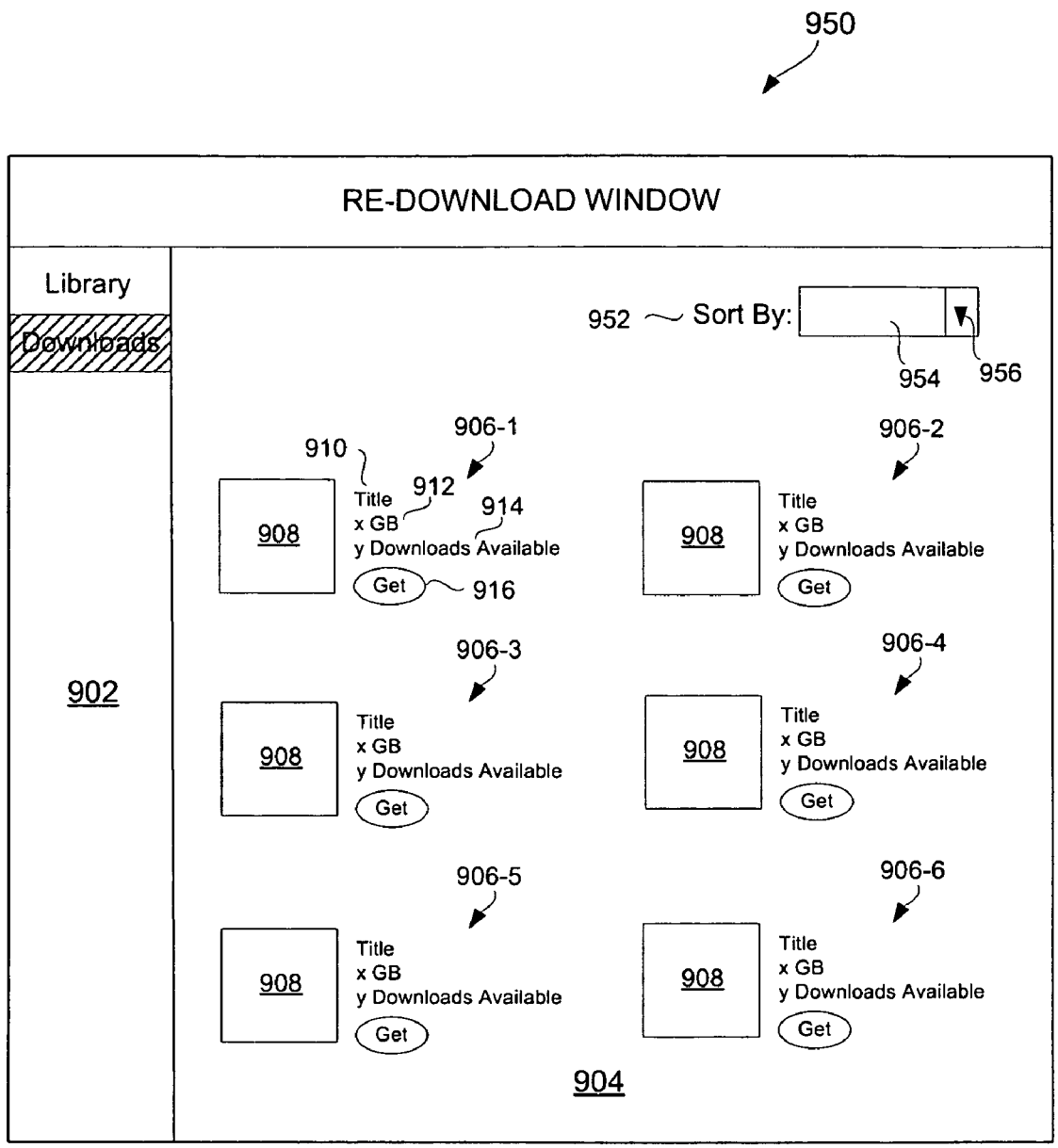
FIG. 9B is a diagram of a representative re-download window according to another embodiment of the invention.

FIG. 9B is a diagram of a representative re-download window 950 according to another embodiment of the invention. The re-download window 950 can also be referred to as a re-download availability page. The re-download window 950 can likewise be presented on a device associated with the client device. The re-download window 950 is generally the same as the re-download window 900 illustrated in FIG. 9A. However the re-download window 950 further supports sorting of the media assets that are available to be re-downloaded. In this regard, in one embodiment, the re-download window 950 can further include a sort control 952. The sort control 952 is a user interface control that enables a user to select a sort criteria 954 and then have the media assets that are available to be re-download sorted in accordance with the selected sort criteria. In particular, the user can select a user control 956 to display a list of available sort criteria. As an example, the list of available sort criteria can include sort criteria such as: expiration date, artist, price, purchase date, and best-sellers. The sort criteria could also be performed or filtered based on media type, such as: songs, movies, and TV shows. The user can then select one of the available sort criteria to be used as the sort criteria 954. The re-download window 950 can be refreshed so as to re-present the different media assets 906 in a different order based on the selected available sort criteria.

Figure 10:
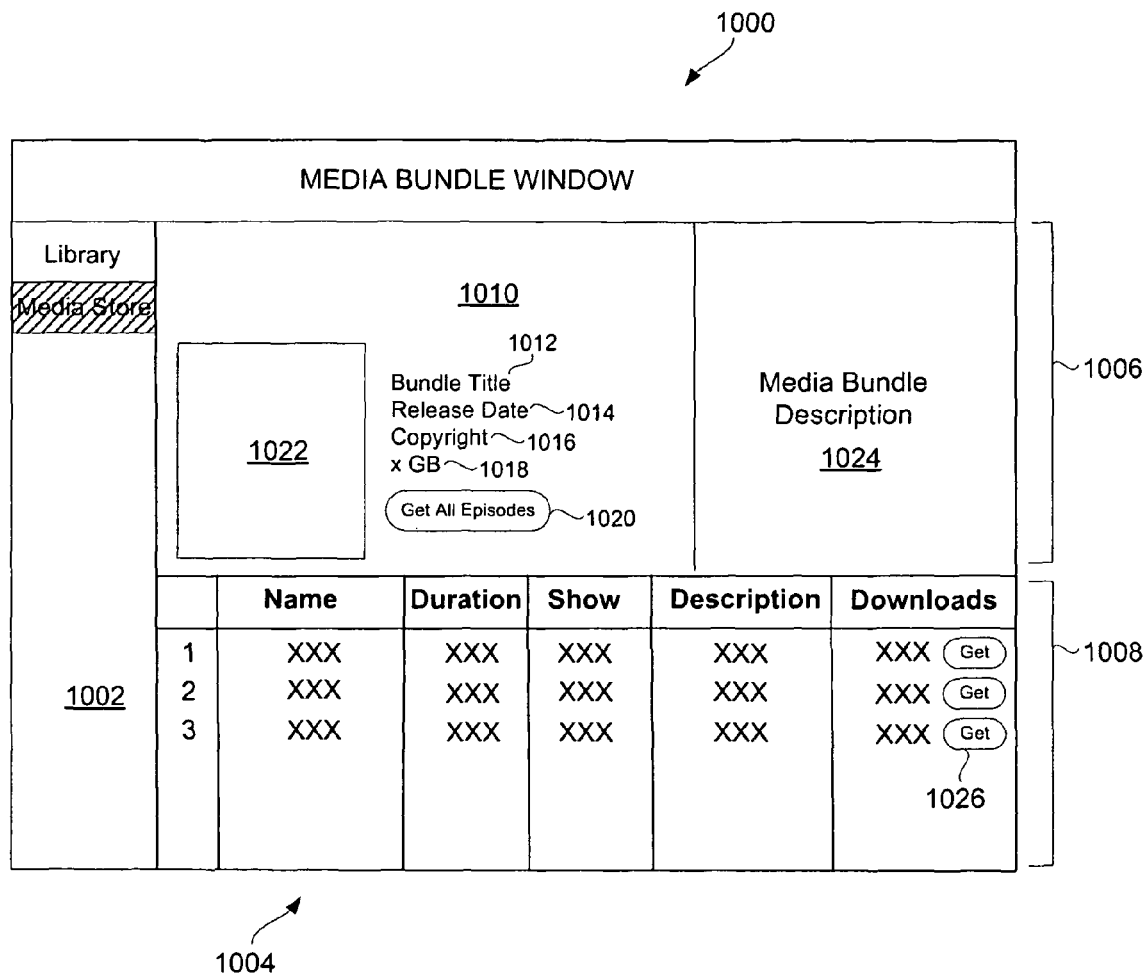
FIG. 10 is a diagram of a representative media bundle window according to one embodiment of the invention.

FIG. 10 is a diagram of a representative media bundle window 1000 according to one embodiment of the invention. The media bundle window 1000 is typically presented on a display associated with a client device when the client device is interacting with the on-line media store via a computer program, such as a Media Management Application (MMA) or a network browser. The media bundle window 1000 can be provided locally or remotely. When provided remotely, the content for the media bundle window 1000 can be provided by a remote server. More particularly, when the user is interacting with a media acquisition server (e.g., on-line media store) to view information pertaining to a set of media items, namely, a season of a television show, the media acquisition server can also cause the media bundle window 1000 to be presented on the display device. For example, if the media asset 906 is a bundle, selection of the bundle can cause the media bundle window 100 to be displayed so that user can be informed of those episodes available for download. The media bundle window 1000 includes a source portion 1002 and a media descriptive portion 1004. The source portion 1002 indicates the source for the information being presented in the media descriptive portion 1004. In this example, the source portion 1002 indicates that a "Media Store" has been selected, such that the information being presented in the media descriptive portion 1004 is information provided by a media acquisition server. In this case, the information corresponds to one of a plurality of media bundles that are available for purchase from the on-line media store. The media descriptive portion 1004 includes a bundle information portion 1006 and an episode listing area 1008. The bundle information portion 1006 includes information pertaining to the bundle. For example, the bundle information portion 1006 includes a media bundle characteristics region 1010 having a title 1012, a release date 1014, copyright information 1016, a size 1018, and a "Get All Episodes" button 1020. Upon selecting the "Get All Episodes" button 1020, the user requests to get all episodes for the media bundle that are available for re-download. The media bundle characteristics region 1010 can also display a bundle graphic 1022. The bundle graphic 1022, for example, can be a still graphic, animated graphics or video associated with the bundle. The bundle information portion 1006 can also include a media bundle description 1024 (e.g., a text description). The media bundle description 1024 can provide additional detail on the media bundle.

The episode listing area 1008 illustrates the episodes of the bundle that are available for re-download. For each of the episodes listed in the episode listing area 1008, the name, duration, show, description and available downloads for such episode can be displayed in the episode listing area 1008. In this example, there are three episodes that are available for re-download. User selection of a user interface control 1026 (e.g., "Get" button) can initiate a re-download for a corresponding episode.

Figure 11:
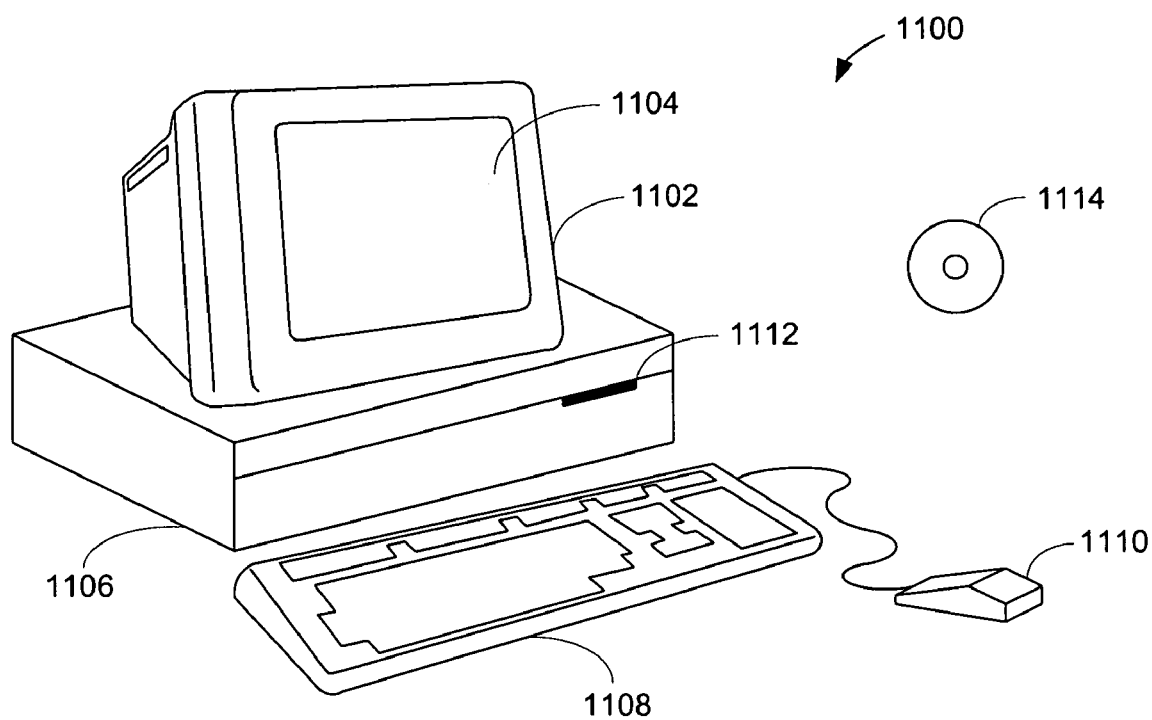
FIG. 11 shows an exemplary computer system suitable for use with the invention.

FIG. 11 shows an exemplary computer system 1100 suitable for use with the invention. Although the client device need not be a personal computer, the client device can be the exemplary computer system 1100 illustrated in FIG. 11. The computer system 1100 includes a display monitor 1102 having a single or multi-screen display 1104 (or multiple displays), a cabinet 1106, a keyboard 1108, and a mouse 1110. The cabinet 1106 houses a processing unit (or processor), system memory and a hard drive (not shown). The cabinet 1106 also houses a drive 1112, such as a CD-ROM or floppy drive. The drive 1112 can also be a removable hard drive, a Flash or EEPROM device, etc. Regardless, the drive 1112 may be utilized to store and retrieve software programs incorporating computer code that implements some or all aspects of the invention, data for use with the invention, and the like. Although CD-ROM 1114 is shown as an exemplary computer readable storage medium, other computer readable storage media including floppy disk, tape, Flash or EEPROM memory, memory card, system memory, and hard drive may be utilized. Additionally, a data signal embodied in a carrier wave (e.g., in a network) may be the computer readable storage medium. In one implementation, a software program for the computer system 1100 is provided in the system memory, the hard drive, the CD-ROM 1114 or other computer readable storage medium and serves to incorporate the computer code that implements some or all aspects of the invention.

The digital media assets (i.e., digital media items) can pertain to video items (e.g., video files or movies), audio items (e.g., audio files or audio tracks, such as for songs (music) or audiobooks), or image items (e.g., photos). The digital media assets can also include or be supplemented by text or multimedia files.

The various aspects, features, embodiments or implementations of the invention described above can be used alone or in various combinations.

The invention is preferably implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that a media acquisition server can serve as not only an acquisition source for digital media assets but also a backup resource for digital media assets that have be acquired. Hence, a media acquisition server can provide a remote backup solution for users that have obtained authorized copies of digital media assets. Another advantage of the invention is that media assets can be re-downloaded from a remote server via a network (as opposed to having to reacquire such media assets). Still another advantage of the invention is that a quantity of re-downloads can be allotted to a particular previously acquired digital media asset and then managed to permit limited re-downloads. The quantity of re-download allotted can depend on various criteria. Yet still another advantage of the invention is that re-download allotments can be acquired and then used to gain additional re-downloads of those digital media assets to which the re-download allotments are assigned.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for downloading a digital media asset from a network-based storage device to a client device via a network, said method comprising:

identifying a digital media asset of interest;

receiving a purchase request for the identified media asset from a requestor operating the client device;

determining whether any re-downloads are available for the identified media asset in response to the purchase request;

informing the requestor of the available re-downloads for the identified media asset;

receiving a user input indicating whether the requestor desires to initiate a re-download request or continue with the purchase request in view of the available re-downloads for the identified media asset; and processing the re-download request if the user input received indicates that the requestor desires to receive a re-download instead of continuing with the purchase request.

2. A method as recited in claim 1, wherein said method further comprises:
processing the purchase request if the user input received indicates that the requestor desires to continue with the purchase request.

3. A method as recited in claim 2, wherein said processing of the purchase request comprises:
initiating a purchase transaction for the identified media asset; and
making the identified media asset available for download by the requestor from the network-based storage device to the client device via the network.

4. A method as recited in claim 3, wherein said processing of the purchase request comprises:
determining a re-download allotment for the identified media asset; and
associating the re-download allotment to the identified media asset that has been purchased by the requestor, the re-download allotment specifying a number of re-downloads of the identified media asset permitted by the requestor.

5. A method as recited in claim 4, wherein the re-download allotment for the identified media item is associated with a user account of the requestor such that a re-download is permitted to any client device authorized for user by the requestor.

6. A method as recited in claim 4, wherein said processing of the re-download request comprises:
processing the re-download request such that the identified media asset is downloaded from the network-based storage device to the client device;
retrieving a re-download allotment for the identified media asset; and
reducing the re-download allotment based on the identified media asset being re-downloaded.

7. A method as recited in claim 4, wherein said processing of the download request comprises:
offering an opportunity to acquire additional assignable re-download allotments;
acquiring one or more additional assignable re-download allotments;
allocating at least one of the assignable re-download allotments to the identified digital media asset;
processing the re-download request such that the identified media asset is downloaded from the network-based storage device to the client device;
retrieving a re-download allotment for the identified media asset; and
reducing the re-download allotment based on the identified media asset being re-downloaded.

8. A method as recited in claim 1, wherein said informing comprises:
displaying a dialog on a display associated with the client device that requests another user input.

9. A method as recited in claim 1, wherein said processing of the re-download request comprises:
processing the re-download request such that the identified media asset is downloaded from the network-based storage device to the client device; and
storing the identified media asset that has been downloaded to the client device.

10. A method as recited in claim 9, wherein said processing of the download request further comprises:
retrieving a re-download allotment for the identified media asset; and
reducing the re-download allotment based on the identified media asset being re-downloaded.

11. A non-transitory computer readable storage medium including at least computer program code stored thereon that can be used by a computer to download digital media assets from a network-based storage device to a client device via a network, said computer readable storage medium comprising:
computer program code for identifying a digital media asset of interest;
computer program code for receiving a purchase request for the identified media asset from a requestor operating the client device;
computer program code for determining whether any re-downloads are available for the identified media asset in response to the purchase request;
computer program code for informing the requestor of the available re-downloads for the identified media asset;
computer program code for receiving a user input indicating whether the requestor desires to initiate a re-download request or continue with the purchase request in view of the available re-downloads for the identified media asset; and
computer program code for processing the re-download request if the user input received indicates that the requestor desires to receive a re-download instead of continuing with the purchase request.

12. A non-transitory computer readable storage medium as recited in claim 11, wherein said computer program code for method further comprises:
computer program code for processing the purchase request if the user input received indicates that the requestor desires to continue with the purchase request.

13. A non-transitory computer readable storage medium as recited in claim 12, wherein said computer program code for processing of the purchase request comprises:
computer program code for initiating a purchase transaction for the identified media asset; and
computer program code for making the identified media asset available for download by the requestor from the network-based storage device to the client device via the network.

14. A non-transitory computer readable storage medium as recited in claim 13, wherein said computer program code for processing of the purchase request comprises:
computer program code for determining a re-download allotment for the identified media asset; and
computer program code for associating the re-download allotment to the identified media asset that has been purchased by the requestor, the re-download allotment specifying a number of re-downloads of the identified media asset permitted by the requestor.

15. A non-transitory computer readable storage medium as recited in claim 14, wherein the re-download allotment for the identified media item is associated with a user account of the requestor such that a re-download is permitted to any client device authorized for user by the requestor.

16. A non-transitory computer readable storage medium as recited in claim 14, wherein said computer program code for processing of the re-download request comprises:
computer program code for processing the re-download request such that the identified media asset is downloaded from the network-based storage device to the client device;

computer program code for retrieving a re-download allotment for the identified media asset; and computer program code for reducing the re-download allotment based on the identified media asset being re-downloaded.

17. A non-transitory computer readable storage medium as recited in claim 14, wherein said computer program code for processing of the download request comprises:

cōmputer program code for offering an opportunity to acquire additional assignable re-download allotments;

computer program code for acquiring one or more additional assignable re-download allotments;

computer program code for allocating at least one of the assignable re-download allotments to the identified digital media asset;

computer program code for processing the re-download request such that the identified media asset is downloaded from the network-based storage device to the client device;

computer program code for retrieving a re-download allotment for the identified media asset; and computer program code for reducing the re-download allotment based on the identified media asset being re-downloaded.

18. A non-transitory computer readable storage medium as recited in claim 17, wherein said computer program code for informing comprises:

computer program code for displaying a dialog on a display associated with the client device that requests another user input.

19. A non-transitory computer readable storage medium as recited in claim 17, wherein said computer program code for processing of the re-download request comprises:

computer program code for processing the re-download request such that the identified media asset is downloaded from the network-based storage device to the client device; and computer program code for storing the identified media asset that has been downloaded to the client device.

20. A non-transitory computer readable storage medium as recited in claim 19, wherein said computer program code for processing of the download request further comprises:

computer program code for retrieving a re-download allotment for the identified media asset; and computer program code for reducing the re-download allotment based on the identified media asset being re-downloaded.

21. A system for managing re-download of digital media assets, said system comprising:

user accounts established for a plurality of account holders;

a media storage device configured to store a plurality of digital media assets;

a server device for providing online access to browse or acquire one or more of the digital media assets; and a re-download manager configured to manage availability of re-downloads for qualifying ones of the digital media assets in accordance with said user accounts with respect to a particular account holders, wherein said re-download manager is configured to at least (i) receive a purchase request for an identified media asset from a requestor operating the client device; (ii) determine whether any re-downloads are available for the identified media asset in response to the purchase request; (iii) receive a user input indicating whether the requestor desires to initiate a re-download request or continue with the purchase request in view of the available re-downloads for the identified media asset; and (iv) process the re-download request if the user input received indicates that the requestor desires to receive a re-download instead of continuing with the purchase request.

22. A system as recited in claim 21, wherein the quantity of re-downloads available for the identified media asset is limited.

23. A system as recited in claim 21, wherein said re-download manager is configured to:

determine a re-download allotment for the identified media asset; and associate the re-download allotment to the identified media asset that has been purchased by the requestor, the re-download allotment specifying a number of re-downloads of the identified media asset permitted by the requestor.

24. A system as recited in claim 23, wherein the re-download allotment for the identified media item is associated with a user account of the requestor such that a re-download is permitted to any client device authorized for user by the requestor.

25. A system as recited in claim 17, wherein the process of the re-download request by said re-download manager, said re-download manager is configured to:

process the re-download request such that the identified media asset is downloaded from the network-based storage device to the client device; and store the identified media asset that has been downloaded to the client device.

\* \* \* \* \*